(12) United States Patent
Zhu (10) Patent No.: US 11,603,029 B2
(45) Date of Patent: Mar. 14, 2023

(54) WINCH FOR SECURING A LOAD

(71) Applicant: Jianjun Yin, Cincinnati, OH (US)

(72) Inventor: ZiCheng Zhu, Shanghai (CN)

(73) Assignee: Jianjun Yin, Cincinatti, OH (US)

( * ) Notice: Subject to any disclaimer, the term of this patent is extended or adjusted under 35 U.S.C. 154(b) by 32 days.

(21) Appl. No.: 17/235,689

(22) Filed: Apr. 20, 2021

(65) Prior Publication Data
US 2021/0237639 A1 Aug. 5, 2021

(51) Int. Cl.
| | |
|---|---|
| *B66D 1/74* | (2006.01) |
| *B60P 7/08* | (2006.01) |
| *F16D 15/00* | (2006.01) |
| *F16D 48/00* | (2006.01) |
| *F16H 1/16* | (2006.01) |

(52) U.S. Cl.
CPC .......... *B60P 7/0846* (2013.01); *B66D 1/7484* (2013.01); *B66D 1/7489* (2013.01); *F16D 15/00* (2013.01); *F16D 48/00* (2013.01); *F16H 1/16* (2013.01)

(58) Field of Classification Search
CPC ....... B60P 7/083; B60P 7/0838; B60P 7/0846; B60P 7/0853; B66D 1/04; B66D 1/12; B66D 1/16; B66D 1/7484; F16D 15/00; F16H 1/16
See application file for complete search history.

(56) References Cited

U.S. PATENT DOCUMENTS

| | | | | |
|---|---|---|---|---|
| 3,799,005 | A | * | 3/1974 | Koehler ................... B66D 1/04 |
| | | | | 254/354 |
| 6,085,368 | A | * | 7/2000 | Robert ................. A61G 7/1051 |
| | | | | 74/400 |
| 7,216,849 | B2 | * | 5/2007 | Tremblay .............. B60P 7/0846 |
| | | | | 24/69 ST |
| 7,278,808 | B1 | * | 10/2007 | Sisk, Sr. ............... B60P 7/0853 |
| | | | | 279/144 |
| 7,766,271 | B1 | | 8/2010 | Confoey |
| 2008/0302289 | A1 | * | 12/2008 | Mann ................... B66D 1/7484 |
| | | | | 254/266 |
| 2022/0009755 | A1 | * | 1/2022 | Forney ..................... B66D 1/06 |

FOREIGN PATENT DOCUMENTS

| | | | | |
|---|---|---|---|---|
| CA | 2745582 A1 | * | 7/2010 | .............. B60P 7/083 |
| WO | WO-9731856 A1 | * | 9/1997 | ........... B66D 1/7426 |
| WO | WO-2020220210 A1 | * | 11/2020 | ............... B66D 1/16 |

* cited by examiner

*Primary Examiner* — Emmanuel M Marcelo
(74) *Attorney, Agent, or Firm* — Welsh IP Law LLC (57) ABSTRACT

A winch for securing a load to a vehicle a is disclosed. The winch includes a mounting bracket with opposed flanges. The winch further includes a drum extending along an axis between a first end and a second end. The drum is mounted relative to the opposed flanges so that the drum is rotatable about its axis. The winch includes a gear received on the drum and a worm configured to mesh with the gear so that a rotation of the worm causes a rotation of the gear. The winch further includes a clutch assembly between the drum and the gear. The clutch assembly is biasable between a first configuration in which the gear is fixed relative to the drum about the axis of the drum and a second configuration in which the gear is rotatable relative to the drum about the axis of the drum.

17 Claims, 8 Drawing Sheets

WINCH FOR SECURING A LOAD

TECHNICAL FIELD

The present disclosure generally relates a mechanical retention device and more specifically relates to a winch retaining a fixing a load to a position by a strap.

BACKGROUND

During road shipping of goods on an open flat-bed trailer, a strap tightening system is required—and is compulsory under government regulations—to maintain the load in place over the trailer flat-bed. Loads on open trailers can be conventionally held in place by wrap-around straps, extending transversely over the load and spaced from one another. Each of these straps is tightened in place by a corresponding winch.

It is known to use winches and straps to secure loads to a trailer. Known winches, for example, may comprise a slit for receiving an end of a fastening strap, a reel for winding the strap about the same, and a hole or opening for receiving a winding bar so as to be able to wind and tighten the strap about the reel. A disadvantage of these known winches is that they require significant force generated from a winch bar which require significant human force and is prone to dislodge from the system causing injury.

In is known to overcome these problems by using a gear assembly with a worm gear wherein the worm is turned to drive the gear and thereby the winch. The friction between the worm and the gear retains tension in the strap after the turning force is applied. A disadvantage of these systems is that it is difficult to release the strap. This is a particular problem when there are multiple winches on a load that must be released or adjusted. In order to expedite this process, the known winches employing this gear assembly provide a worm that is disengageable from the gear. There are several disadvantages with this design. First, there is the potential for the worm to unintentionally disengage from the gear. For example, this could occur during transport of the load, resulting in injury or death and potential damage to the load and other equipment. Another disadvantage of these systems is that movement of the worm relative to the gear can lead to less than full engagement between the worm and the gear. Another problem with these systems is that they are difficult to maintain in a lubricated state. Another disadvantage is that winches in accordance with the prior art are expensive and therefore not readily adopted in the industry.

Aspects of the present invention are directed to these and other problems.

SUMMARY

The needs set forth herein as well as further and other needs and advantages are addressed by the present teachings, which illustrate solutions and advantages described below.

It is an objective of the present teachings to remedy the above drawbacks and issues associated with prior art selective laser sintering methods.

The present invention resides in one aspect in a winch for securing a load to a vehicle with a strap. The winch includes a mounting bracket with opposed flanges. The winch further includes a drum extending along an axis between a first end and a second end. The drum is mounted relative to the opposed flanges so that the drum is rotatable about its axis. The drum is configured to retain a strap so that a rotation of the drum about the axis in a first direction pays in the strap and a rotation of the drum about the axis in a second direction pays out the strap. The winch further includes a gear assembly comprising a gear received on the drum and a worm configured to mesh with the gear so that a rotation of the worm causes a rotation of the gear. The winch further includes a clutch assembly between the drum and the gear. The clutch assembly is biasable between a first configuration in which the gear is fixed relative to the drum about the axis of the drum and a second configuration in which the gear is rotatable relative to the drum about the axis of the drum.

In yet a further embodiment of the present invention, the winch includes an actuator operably connected to the clutch assembly to bias the clutch assembly between the first configuration and the second configuration.

In yet a further embodiment of the present invention, the winch includes a bore defined by the drum. The bore extends inward along the axis of the drum from an opening in one of the first end and second ends of the drum.

In yet a further embodiment of the present invention, the drum defines a plurality slots and of each of the slots extends radially between the bore and an outer surface of the drum.

In yet a further embodiment of the present invention, the winch comprises a plurality of locking pins and each of the locking pin is received in one of the plurality of slots.

In yet a further embodiment of the present invention, in the first configuration of the clutch assembly in which the gear is fixed relative to the drum about the axis of the drum, each of the plurality of pins extend radially beyond the outer surface of the drum to engage with an inside surface of the gear.

In yet a further embodiment of the present invention, in the second configuration of the clutch assembly in which the gear is rotatable relative to the drum about the axis of the drum, each of the plurality of pins are flush with or below the outer surface of the drum.

In yet a further embodiment of the present invention, the winch comprises a clutch shaft received in the bore of the drum. The clutch shaft is rotatable about the axis of the drum.

In yet a further embodiment of the present invention, the clutch shaft comprises a plurality of axially extending channels in an outer surface of the clutch shaft. Each of the channels define a concave arcuate surface in a plane perpendicular to the axis of the clutch shaft.

In yet a further embodiment of the present invention, the shaft comprises a plurality of axially extending convex arcuate surfaces, wherein each of the convex arcuate surfaces is disposed between concave arcuate surfaces.

In yet a further embodiment of the present invention, wherein in the first configuration of the clutch assembly in which the gear is fixed relative to the drum about the axis of the drum, each of the plurality of convex arcuate surfaces is radially aligned with each of the plurality of slots.

In yet a further embodiment of the present invention, the second configuration of the clutch assembly in which the gear is rotatable relative to the drum about the axis of the drum, each of the plurality of concave arcuate surfaces is radially aligned with each of the plurality of slots.

In yet a further embodiment of the present invention, the winch further comprises a plurality of biasing members, each of the biasing members extending radially inward from the drum and configured to contact the outer surface of the clutch shaft.

In yet a further embodiment of the present invention, the biasing members inhibit rotation of the clutch shaft relative to the drum.

In yet a further embodiment of the present invention, the inside surface of the gear comprises a plurality of axially extending concave arcuate surfaces for at least partially receiving the locking pins when the clutch assembly is in the first configuration.

The present invention resides in another aspect in a winch for securing a load to a vehicle with a strap. The winch comprises a mounting bracket with opposed flanges. A drum extends along an axis between a first end and a second end. The drum is mounted relative to the opposed flanges so that the drum is rotatable about its axis. The drum is configured to retain a strap so that a rotation of the drum about the axis in a first direction pays in the strap and a rotation of the drum about the axis in a second direction pays out the strap. The winch includes a gear assembly comprising a gear received on the drum and a worm configured to mesh with the gear so that a rotation of the worm causes a rotation of the gear. The winch further includes a clutch shaft disposed in a bore in the drum and rotatable relative to the bore between a first position in which the gear is fixed relative to the drum about the axis of the drum and a second position in which the gear is rotatable relative to the drum about the axis of the drum.

In yet a further embodiment of the present invention, the drum defines an aperture radially connecting an opening in the outer surface of the drum and an opening in a surface of the drum that defines the bore.

In yet a further embodiment of the present invention, the winch comprises a locking member slideably disposed in the aperture.

In yet a further embodiment of the present invention, in the first position the locking member extends radially from the drum to engage with the gear.

In yet a further embodiment of the present invention, the winch of claim 19, further comprises a biasing member to inhibit rotation of the clutch shaft relative to the drum about the drum axis.

These and other aspects of the present invention will become apparent in light of the drawings and detailed description provided below.

DETAILED DESCRIPTION

The present disclosure describes aspects of the present invention with reference to the exemplary embodiments illustrated in the drawings; however, aspects of the present invention are not limited to the exemplary embodiments illustrated in the drawings. It will be apparent to those of ordinary skill in the art that aspects of the present invention include many more embodiments. Accordingly, aspects of the present invention are not to be restricted in light of the exemplary embodiments illustrated in the drawings. It will also be apparent to those of ordinary skill in the art that variations and modifications can be made without departing from the true scope of the present disclosure. For example, in some instances, one or more features disclosed in connection with one embodiment can be used alone or in combination with one or more features of one or more other embodiments.

In reference to FIGS. 1-8 a winch 10 in accordance with one embodiment of the present invention is illustrated. The winch 10 comprises a drum 20 that extends from a first end 22 and to a second end 24. The terms first and second end are used generally to refer to the orientation of the drum 20 and the position of the strap relative thereto and are not intended to limit the present invention. The terms do not refer to an absolute distal or proximal end, unless specifically stated herein. The disclosure refers to a gear assembly for driving drum 20 at the second end 24 of the drum 20. A person of skill in the art and familiar with the disclosure will understand generally that the term first and second end, when used in reference to the drum refer to the opposing portions of the drum between which a strap is received.

Figure 1:
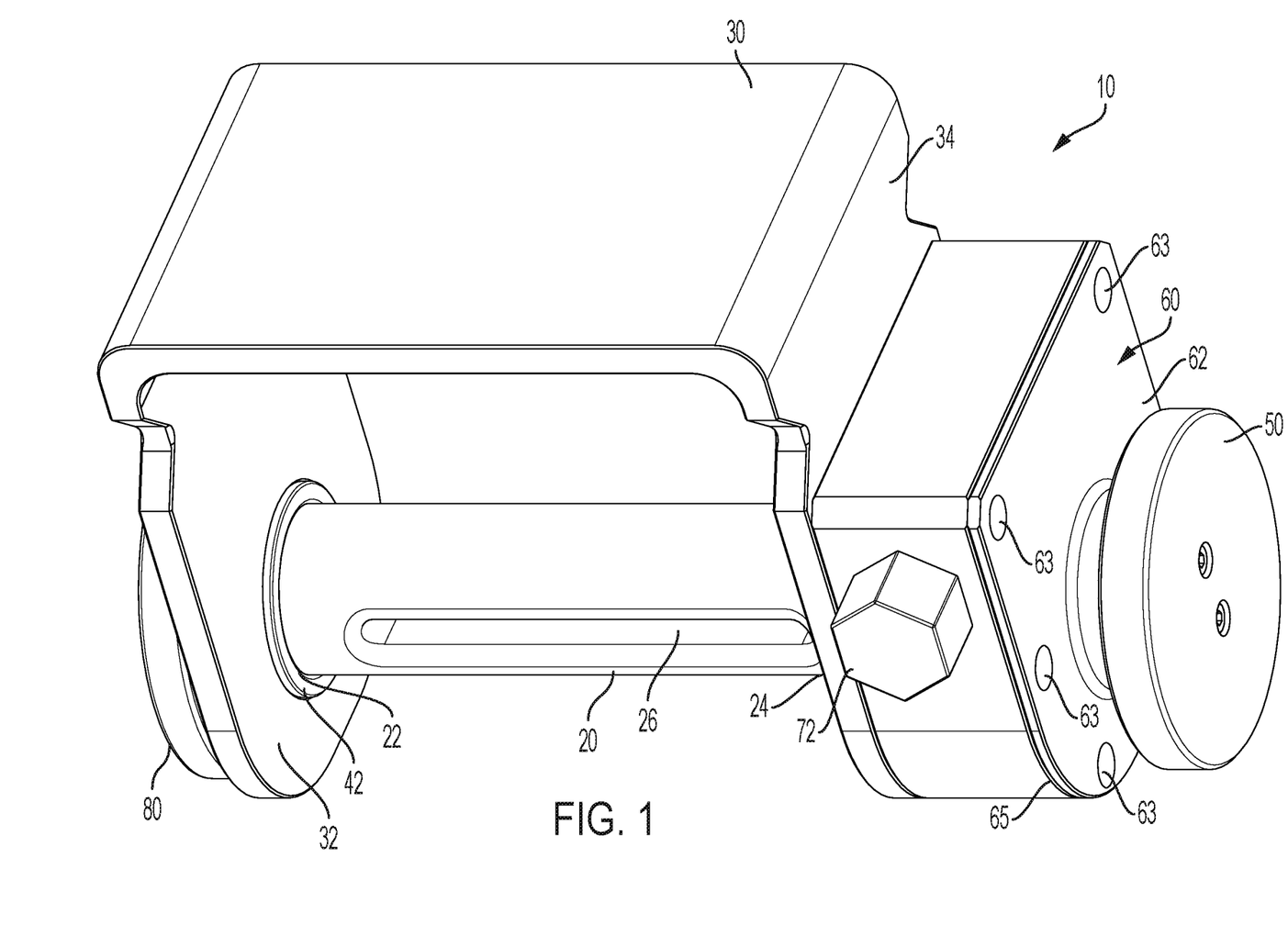
FIG. 1 is a view of a winch in accordance with one embodiment of the present invention.

The drum 20 extends along an axis from the first end 22 to the second end 24. In some embodiments, the drum 20 includes a transverse opening 26 for receiving a retaining strap. A person of skill in the art and familiar with this disclosure will understand that the invention is not limited in this regard and that other methods and techniques for fixing a strap or other binding material may be employed with the winch in accordance with the present invention. In some embodiments a transition is formed between the opening 26 and the drum 20 to ensure that a strap received therein is not damaged.

The drum 20 is rotatably mounted in a bracket 30. The bracket 30 includes a base and opposing flanges 32, 34 extending from the base. The first flange 32 defines an opening configured to receive the first end 22 of the drum 20. In the embodiment shown, a first bushing 42 is received in the opening. The first bushing 42 facilitates rotation of the drum 20 about its axis relative to the first flange 32. A person of skill in the art and familiar with this disclosure will understand that different techniques for receiving the drum 20 in the first flange 42 may be employed. For example, in some embodiments a roller bearing may be used. In other embodiments, the drum is received in the first flange 32 without a bushing. The first end 22 of the drum 20 extends through the hole in the first flange 32. A hand wheel 80 is fixed to the distal end of the drum. The hand wheel 80 enables an operator to turn the drum 20 in the first direction about its axis and the second direction about its axis. It should be noted that in the embodiment disclosed in the FIGS., the size and shape of the hand wheel 80 and the gear assembly, discussed further herein, are selected so that force from the gear assembly inhibits rotation of the hand wheel an operator when the worm is engaged with the mesh. Although a hand wheel 80 is shown in embodiment shown in the FIGS., the present invention is not limited in this regard and other shapes or configurations may be employed for manual rotation of the drum 20.

The bracket 30 may be fixed to a transport vehicle such as a flatbed truck or the like. The bracket 30 may be fixed to the vehicle by a weld or by fasteners. In other embodiments, the bracket 30 is received in tracks configured to retain the winch. For example, the first flange 32 and the second flange 34 are provided with notches in an outer surface thereof proximate to the base. The notches are configured so that the winch may be received in a track. The present invention is not limited in this regard and other configurations or techniques may be used to fix the winch 10 relative to the vehicle.

A strap is received in the transverse opening 26. The drum 20 is rotated in a first direction about the drum axis to pay in the strap. This causes a length of strap to wind around the drum 20 and causes a tension in the strap, thereby generating a force that can be harnessed to retain an otherwise unfixed load on a vehicle. The tension force on the strap and friction between the strap retains the strap about the drum 20. The drum 20 is rotated in a second direction about the axis that is opposite the first direction to pay out the strap, thereby detensioning or releasing the strap.

The second end 24 of the drum is received in a bushing 44 in the second flange 34 of the mounting bracket 30. The second end 24 of the drum 20 extends through a hole in the flange 34 and through a housing 60. As will be described herein, a clutch actuator 50 is connected to the second end of the drum 24. The actuator 50 is rotatable relative to the drum 20 about the drum axis, however, as described herein the clutch assembly may include one or more features that inhibit free rotation of the actuator 50 relative to the drum axis. It will be understood to a person of ordinary skill in the art and familiar with this disclosure that the actuator 50 does not enable normal rotation of the drum 20 to pay in or pay out strapping. The actuator 50 is provided and configured for biasing a clutch between a first position wherein the drum 20 is fixed relative to a gear 120 about the drum axis and a second position wherein the drum 20 is rotatable relative to the gear 120 about the drum axis.

The housing 60 retains a worm gear assembly. The worm gear assembly comprises a gear 120. The gear 120 defines an opening through which a portion of the drum 20 is received inside the housing 40. The gear is round an includes a plurality of gear teeth on the outside surface thereof. The winch 10 includes a worm 70 configured to mesh with the teeth in the gear. In the embodiment disclosed FIGS. the axis of rotation of the worm 70 is perpendicular to an axis of rotation of the gear 120. The worm 70 extends along an axis to an end where a head 72 is disposed thereon. The head 72 is configured to receive a standard ratchet to enable manual or powered rotation of the worm 70. As is understood in the art in association with such worm gears, a rotation of the worm 70 about a worm axis causes a rotation of the gear 120 about the gear axis. In the embodiment disclosed, the worm 70 is fixed relative to the gear 120 and cannot be biased to a position wherein the worm is disengaged from the gear. When rotational power is applied to the worm 70, it rotates against the gear 120 and transfers power to the drum 20. The system is designed so that the worm 70 can easily turn the gear 120, but the gear 120 cannot turn the worm 70. The friction between the gear 120 and worm 70 holds the worm in place. This feature can be very useful in retaining heavy loads via the strapping. As is described further below, the winch 10 includes clutch assembly between the drum 20 and the gear 120 that enables release of the strapping without having to rotate the worm and gear 120 that are permanently meshed.

Figure 2:
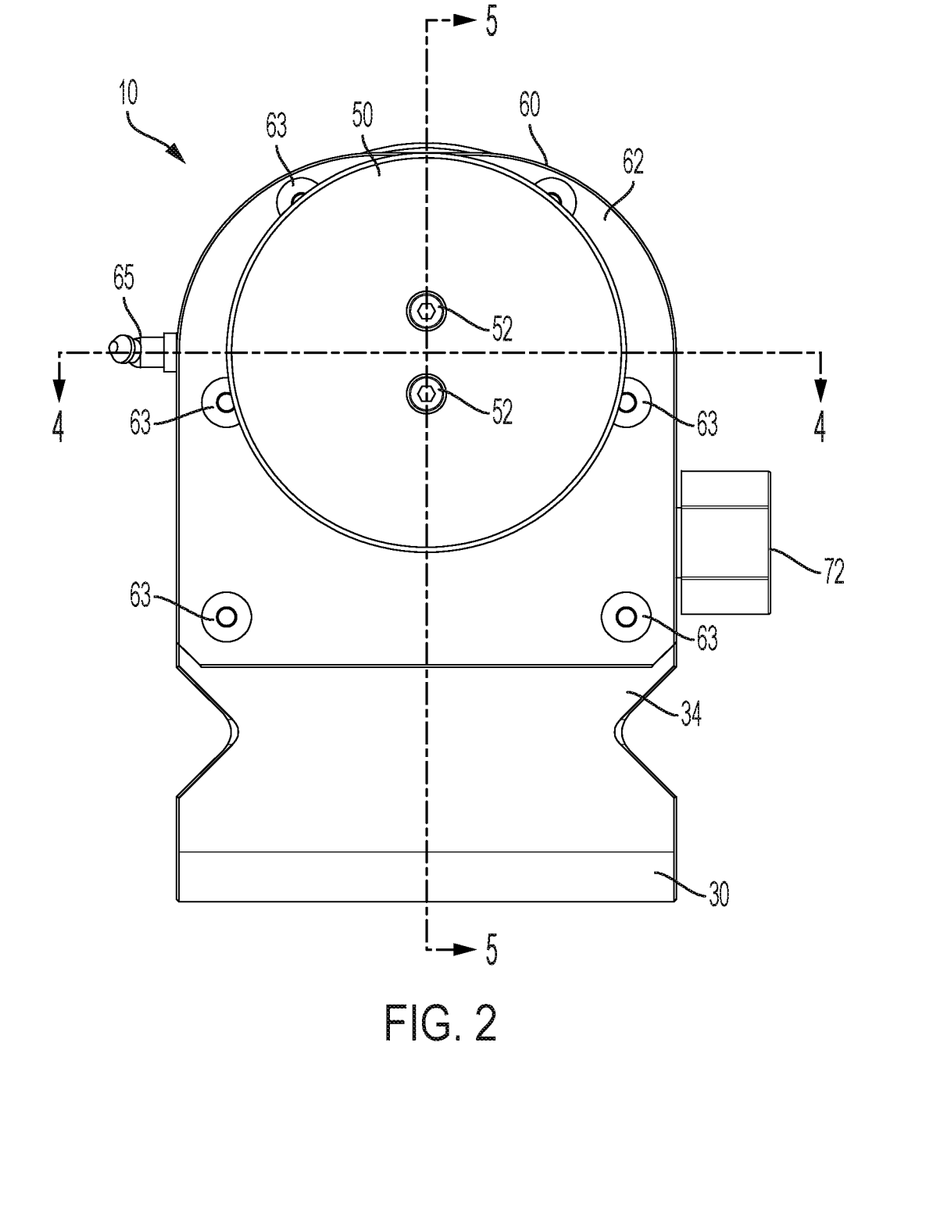
FIG. 2 is a side view of the winch shown in FIG. 1.
Figure 3:
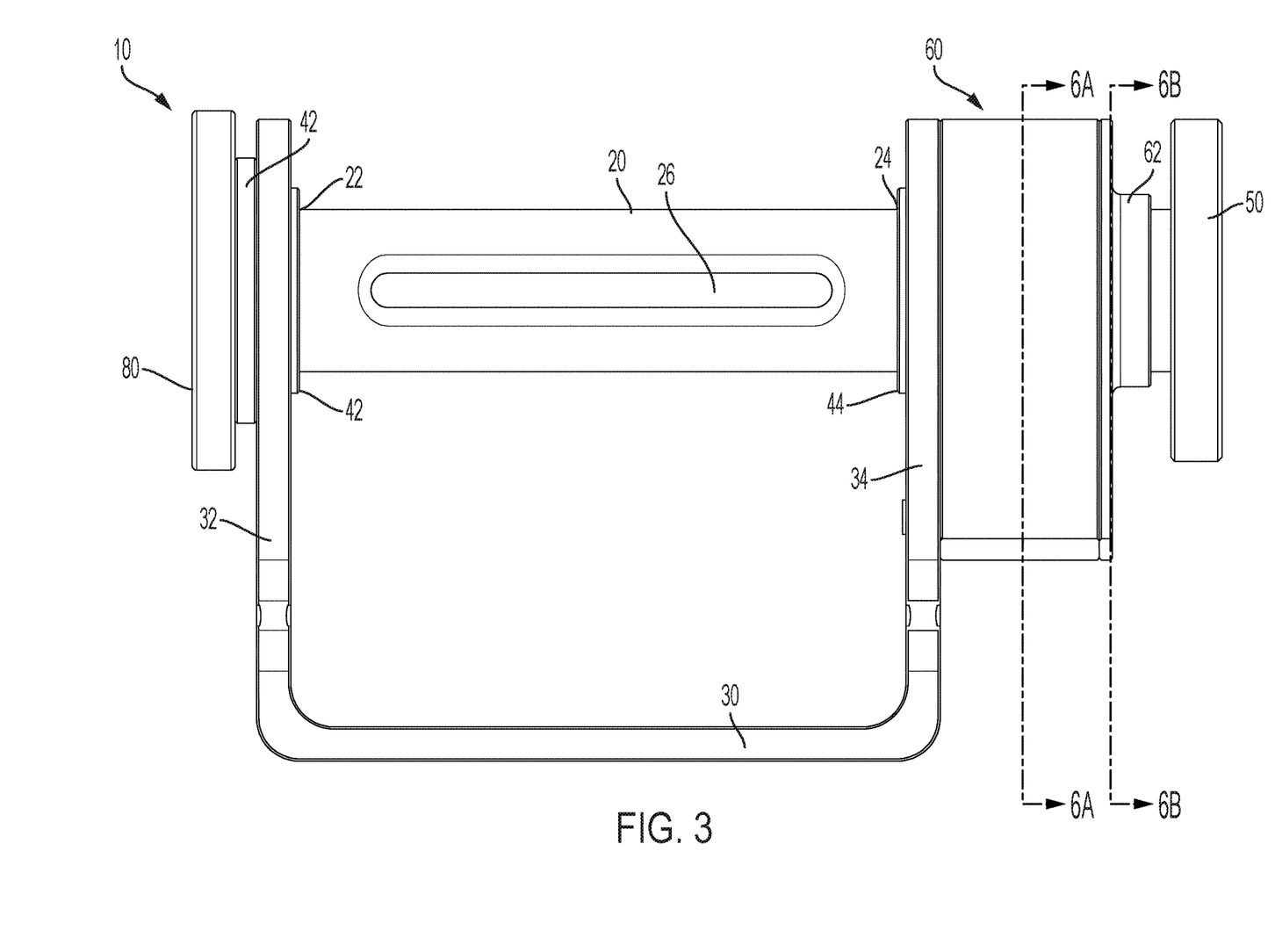
FIG. 3 is a front view of the winch shown in FIG. 1

In reference to FIG. 2, a side view of the winch 10 is shown. The actuator 50 is connected to the winch 10 by two fasteners 52. The housing 60 includes and end plate 62 and fasteners 63 configured to retain the gear assembly and associated structure therein so that it shall remain in a lubricated states. The housing 60 further includes side plating 64. The winch 10 includes a lubrication port 65 that is accessible from outside the winch 10. The lube port 65 is in fluid communication with the gear 120 and clutch assembly and enables introduction of lubricant into the system.

The winch 10 disclosed in the FIGS. includes a clutch assembly between the drum 20 and the gear 120. The clutch assembly is biasable between a first configuration in which the gear 120 is fixed relative to the drum 20 about the axis of the drum 20 and a second configuration in which the gear 120 is rotatable relative to the drum 20 about the axis of the drum.

Figure 8:
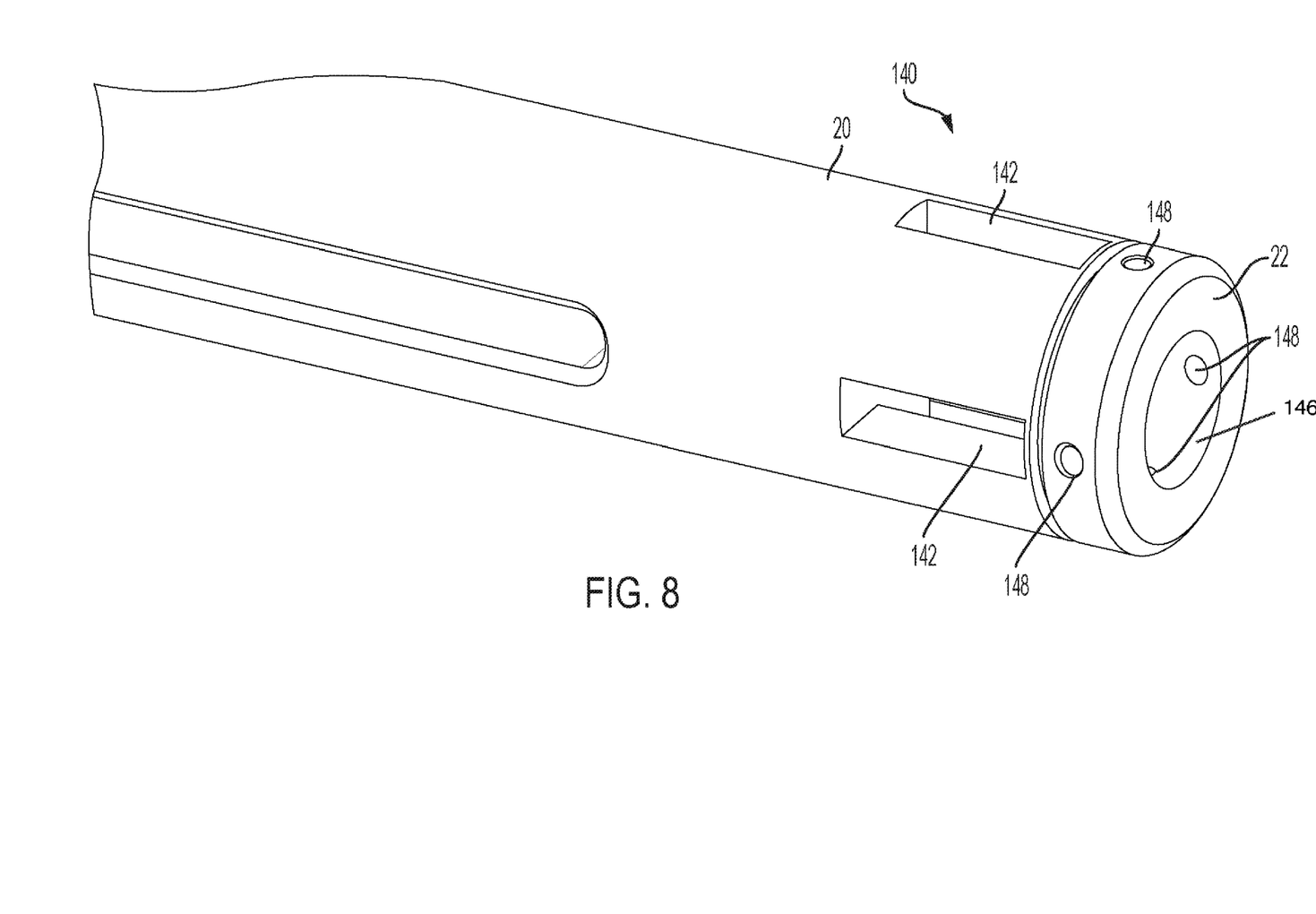
FIG. 8 is a view of a portion of a drum in accordance with the embodiment of the winch illustrated in FIG. 1.

In reference to FIG. 8, the second end 24 of the drum 20 is shown. The drum 20 defines a bore 144 that extends axially from an opening 146 in the second end 24. The bore 144 has a circular cross section. The drum 20 further defines a plurality of slots 142 that radially extend from the bore 144 to the outer surface of the drum 20 so that an area outside the drum 20 is in fluid communication with the bore 144 via the slots 142. In the embodiment disclosed, the slots 142 are generally rectangular, but the present invention is not limited in this regard. A person of skill in the art will understand that different shapes may be employed sufficient for retaining locking members. It should be further understood that while the embodiment disclosed in FIG. 8 includes four slots 142, the present invention is not limited in this regard and the number of slots may vary from one to more than four.

The second end of the drum further includes a plurality of holes 148 spaced axially between the slots 142 and the distal end of the drum. The holes 148 extend between the bore 144 and the outer surface of the drum 20 so that an area outside the drum 20 is in fluid communication with the bore 144 via the holes 148. In the embodiment disclosed, the holes 148 are generally circular, but the present invention is not limited in this regard. A person of skill in the art will understand that different shapes may be employed for retaining biasing members. It should be further understood that while the embodiment disclosed in FIG. 8 includes four holes 148, the present invention is not limited in this regard and the number of holes may vary from one to more than four. It should be further understood that in some embodiments, the holes 148 may terminate prior to opening in the outer surface of the drum 20. It should be further understood to a person of ordinary skill in the art that in some embodiments of the present invention, the holes 148 are not include a separate means, such a torsional biasing member, is provided for inhibiting rotation of the clutch shaft relative to the drum.

In further reference to the drum 20 shown in FIG. 8, a seat for a gasket is provided in the outer surface of the drum 20 between the holes 148 and the slots 142. A gasket is received in the seat when the system is assembled to retain lubricant in the system. The present invention is not limited in this regard.

Figure 4:
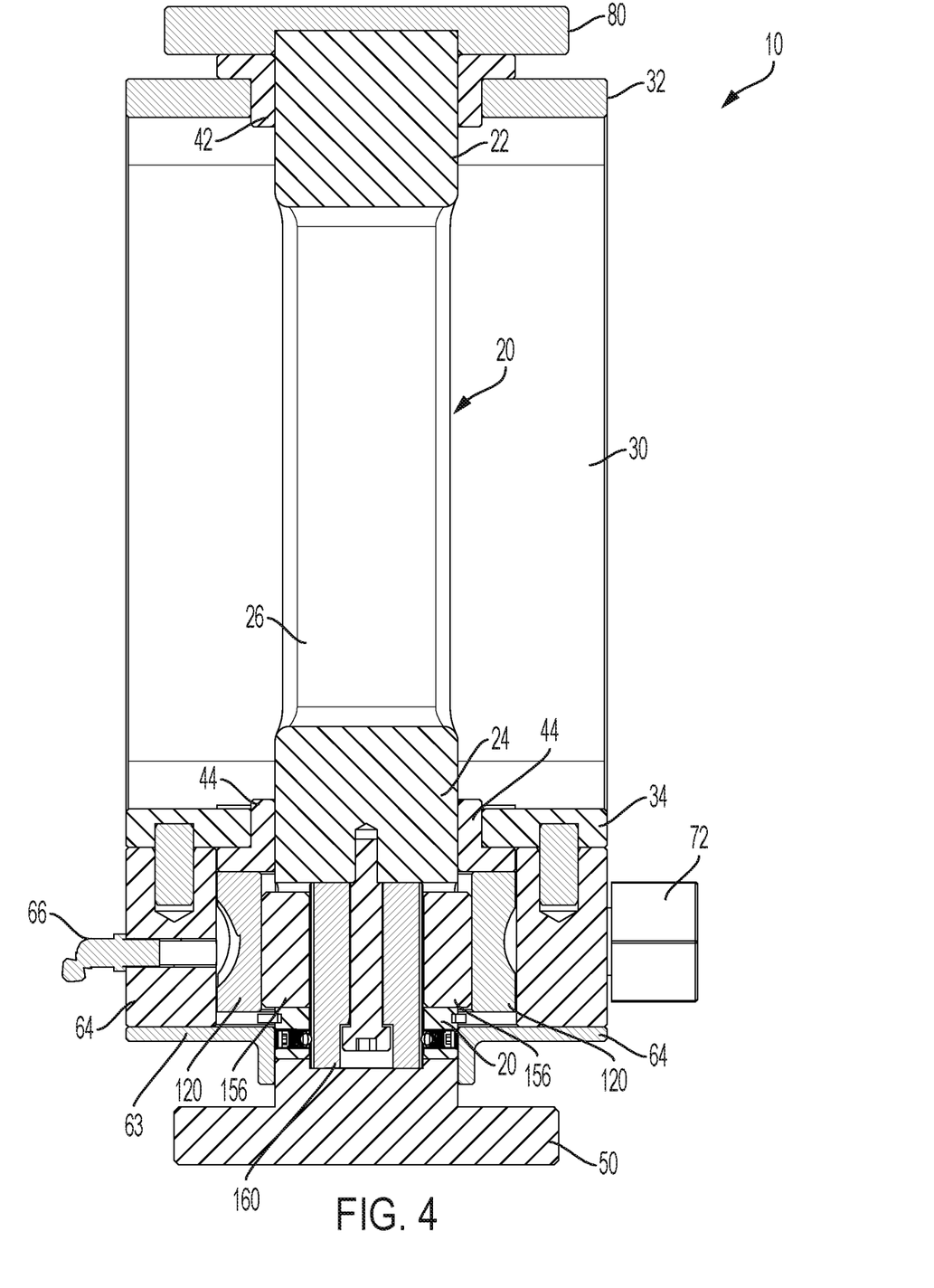
FIG. 4 is shows a cross sectional view through the plane 4-4 of the winch as indicated in FIG. 2.

In FIG. 4, a cross sectional view through the plane 4-4 of the winch 10 as indicated in FIG. 2 is shown. The actuator 50 is connected to the second end 24 of the drum 20 via a clutch shaft 160. The actuator 50 is connected to the clutch shaft 160 by two fasteners 52 so that it is fixed to the clutch shaft 160 about the axis of rotation. The clutch shaft 160 is connected to the drum 20 via fastener 168. The fastener 168 axially retains the clutch shaft 160 relative to the drum 20 but permits rotation of the clutch shaft 168 relative to the drum 20 about the axis of rotation.

Figure 5:
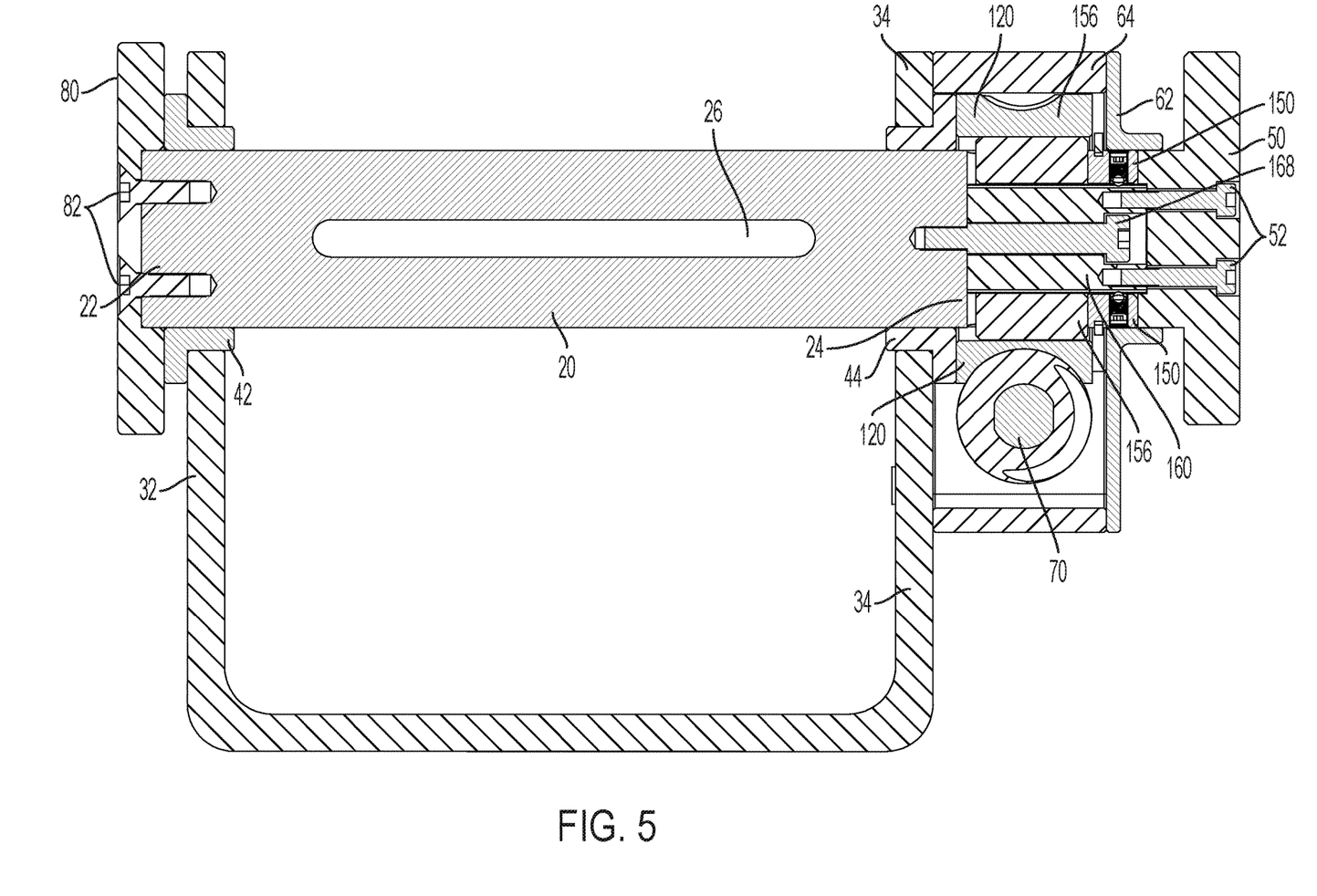
FIG. 5 shows a cross sectional view through the plane 5-5 of the winch as indicated in FIG. 2.

In reference to FIG. 5, the second end 24 of the drum 20 is received in the hole through the gear 120. The clutch shaft 160 is received in the in the bore 144. The winch 10 includes a plurality of locking members 156. In the embodiment shown in the FIGS. the locking members are in the form of cylindrical pins. Each locking pin 156 is disposed in one of the plurality of slots 142. The winch 10 further includes biasing members 150 received in the holes 148 and retained therein at the radial extent by a fastener. The biasing member 150 includes a ball bearing 152 at the radial interior end that contacts an outer surface of the clutch shaft 160. The biasing member 150 is retained under compression such that a radial force is applied to the clutch shaft 160. This radial force generates a tangential friction force between the bearing 150 and the surface of the clutch shaft 160, thereby inhibiting (but allowing) rotation of the clutch shaft 160 relative to the drum 20. As discussed above, the present invention is not limited in regard and other techniques may be employed such as a torsional biasing member.

In reference to FIGS. 6A-6C and 7A-7C, the outer surface 162 of the shaft 160 defines an alternating pattern of concave arcuate surfaces 164 and convex arcuate surfaces 166 in a plane perpendicular to the axis of rotation of the clutch shaft. In the embodiment shown in the FIGS., a notch 167 is provided in the surface of the convex arcuate surfaces 166.

In accordance with one embodiment of the present invention, the clutch assembly is biasable between a first configuration in which the gear 120 is fixed relative to the drum about the axis of the drum and a second configuration in which the gear is rotatable relative to the drum about the axis of the drum. In reference to FIGS. 6A-6C, the clutch assembly is shown in the first configuration in which the gear 120 is fixed relative to the drum 20 about the axis. The clutch shaft 160 is positioned relative to the drum 20 so that the convex arcuate surfaces 166 are aligned with the slots 142. The convex arcuate surfaces 166 pushes the locking pins 156 radially outside the opening of the slots 142 in the outer surface of the drum 20 so that the locking pins engage with an inner surface of the gear 120, thereby fixing the drum relative to the gear about the axis of rotation of the gear. In this configuration, rotation of the worm 70 is transferred to the gear 120 which in turn is transferred to the drum 20, thereby enabling the tensioning of a strap connected to the drum 20.

Figure 6A:
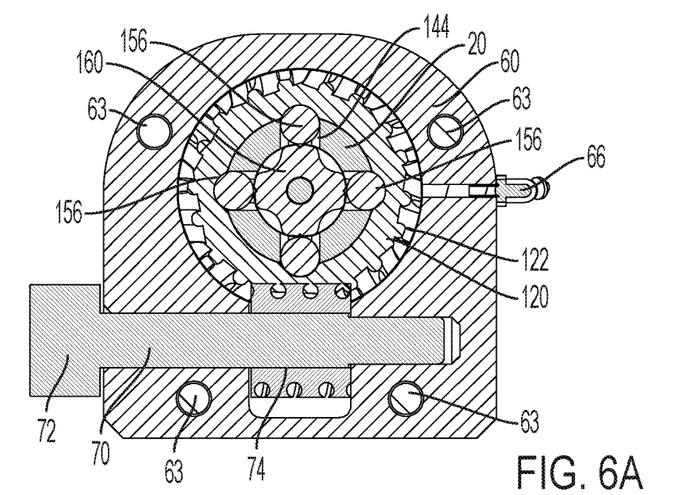
FIG. 6A shows a cross sectional view through the plane 6A-6A of the winch as indicated in FIG. 3 wherein the gear is fixed relative to the drum about the axis of the drum.
Figure 6B:
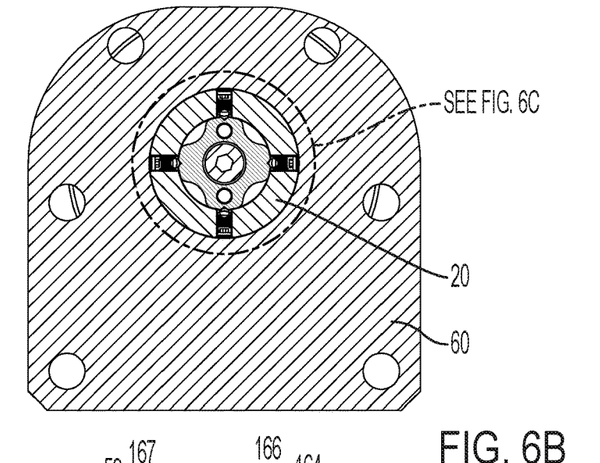
FIG. 6B shows a cross sectional view through the plane 6B-6B of the winch as indicated in FIG. 3.
Figure 6C:
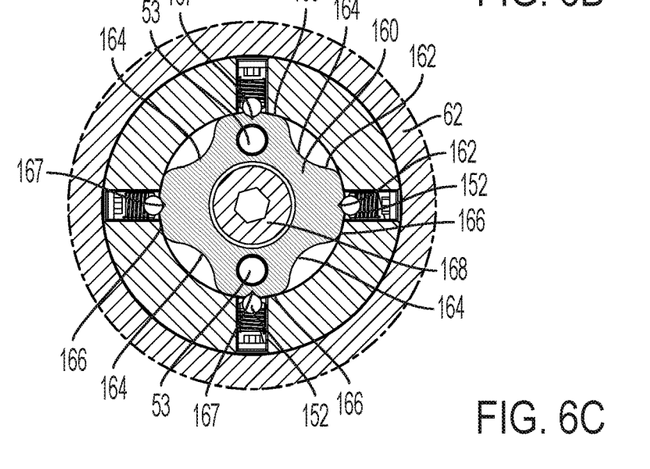
FIG. 6C shows an enlarged view of a portion of FIG. 6B.

In reference to FIGS. 6B and 6C and cross sectional view of the assembly is shown wherein the cross section is axially spaced from the section shown in FIG. 6A, but the clutch shaft 160 is in the same position. In this configuration, the biasing members 150 are compressed and ball bearing 152 at the distal end of the biasing member 150 engage the notch 167 in the convex arcuate surface of the clutch shaft, thereby further inhibiting rotation of the clutch shaft 160 relative to the drum 20. This feature serves to hold or maintain the position of the clutch shaft 160 relative to the drum thereby maintaining gear 120 engagement with the drum 20 and inhibiting unintentional release thereof through the actuator 50.

Figure 7A:
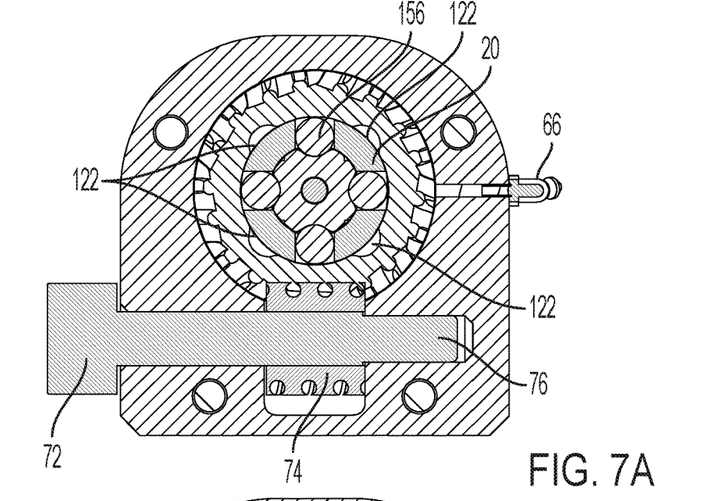
FIG. 7A shows a cross sectional view through the plane 6A-6A of the winch as indicated in FIG. 3 wherein the gear is rotatable relative to the drum about the axis of the drum.
Figure 7B:
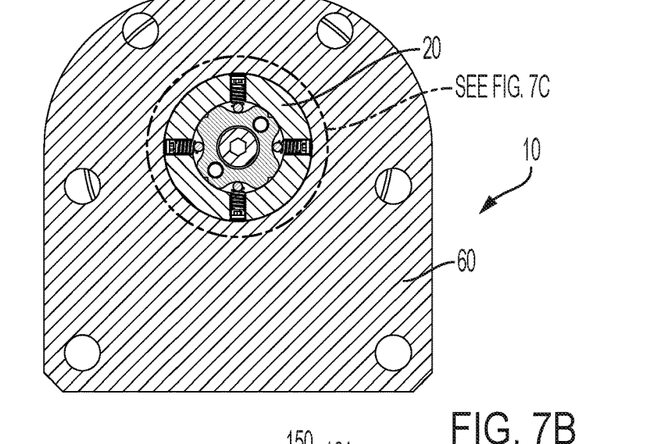
FIG. 7B shows a cross sectional view through the plane 6B-6B of the winch as indicated in FIG. 3.
Figure 7C:
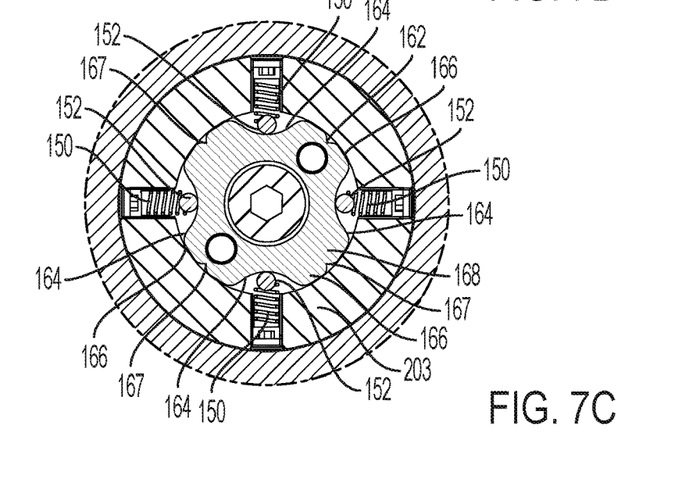
FIG. 7C shows an enlarged view of a portion of FIG. 7B.

In reference to FIGS. 7A-7C, the clutch assembly is shown in the second configuration in which the gear 120 is rotatable relative to the drum 20 about the axis. The clutch shaft 160 is positioned relative to the drum 20 so that the concave arcuate surfaces 164 are aligned with the slots 142. The concave arcuate surfaces 164 partially receive the locking pins 156 so that the locking pins are flush with or below the outer surface of the drum 20. In this manner, the drum 20 is disengaged from the gear 120 and is rotatable relative thereto about the axis of rotation. In this configuration, rotation of the worm 70 is transferred to the gear 120, but it is not transferred to the drum 20, thereby enabling free rotation of the drum by the hand wheel 80. In this second configuration, the operator can quickly pay in or pay out strap from the system without the tedious rotation of the worm gear and its associated gear ratio.

In reference to FIG. 7A the inside surface of the opening in the gear 120 includes a plurality of concave arcuate surfaces 122 for receiving the locking pins when the clutch assembly is in the first configuration. When the clutch assembly is rotated in the second configuration, and the locking pins 156 are retracted, the drum 20 may rotate relative to the gear 120. While gravity may draw on or more of the pins 156 outside the surface of the drum in this configuration, a subsequent rotation of the gear 120 relative to the drum will generate a force on the pins which causes them to roll into the channels formed by the concave arcuate sections in the outer surface of the clutch shaft thereby enabling free rotation of drum relative to the gear.

When the system is in the second configuration, the receiving surfaces on the inside surface of the gear may not be aligned with the slots, thereby inhibits biasing into the first configuration. An operator can align the parts by simultaneously adjusting the actuator and the hand wheel until the members are aligned. In some embodiments of the present invention, there are additional receiving surfaces on the inside of the gear.

The present disclosure describes aspects of the invention with reference to the exemplary embodiments illustrated in the drawings; however, aspects of the invention are not limited to the exemplary embodiments illustrated in the drawings. It will be apparent to those of ordinary skill in the art that aspects of the invention include many more embodiments. Accordingly, aspects of the invention are not to be restricted in light of the exemplary embodiments illustrated in the drawings. It will also be apparent to those of ordinary skill in the art that variations and modifications can be made without departing from the true scope of the present disclosure. For example, in some instances, one or more features disclosed in connection with one embodiment can be used alone or in combination with one or more features of one or more other embodiments.

What is claimed is:

1. A winch for securing a load to a vehicle with a strap, the winch comprising:
   a mounting bracket with opposed flanges;
   a drum extending along an axis between a first end and a second end, the drum mounted relative to the opposed flanges so that the drum is rotatable about its axis, the drum configured to retain the strap so that a rotation of the drum about the axis in a first direction pays in the strap and a rotation of the drum about the axis in a second direction pays out the strap;
   a gear assembly comprising a gear received on the drum and a worm configured to mesh with the gear so that a rotation of the worm causes a rotation of the gear;
   a clutch assembly between the drum and the gear, the clutch assembly biasable between a first configuration in which the gear is fixed relative to the drum about the axis of the drum and a second configuration in which the gear is rotatable relative to the drum about the axis of the drum;
   an actuator operably connected to the clutch assembly to bias the clutch assembly between the first configuration and the second configuration;
   a bore defined by the drum, the bore extending inward along the axis of the drum from an opening in one of the first end and second ends of the drum;

wherein the drum defines a plurality of slots and of each of the slots extends radially between the bore and an outer surface of the drum.

2. The winch of claim 1, comprising a plurality of locking pins, each locking pin being received in one of the plurality of slots.

3. The winch of claim 2, wherein in the first configuration of the clutch assembly in which the gear is fixed relative to the drum about the axis of the drum, each of the plurality of pins extend radially beyond the outer surface of the drum to engage with an inside surface of the gear.

4. The winch assembly of claim 3, wherein in the second configuration of the clutch assembly in which the gear is rotatable relative to the drum about the axis of the drum, each of the plurality of pins are flush with or below an outer surface of the drum.

5. The winch assembly of claim 4, further comprising:
a clutch shaft received in the bore of the drum, the clutch shaft being rotatable about the axis of the drum.

6. The winch assembly of claim 5, wherein the clutch shaft comprises a plurality of axially extending channels in an outer surface of the clutch shaft, each of the channels defining a concave arcuate surface in a plane perpendicular to the axis of the clutch shaft.

7. The winch assembly of claim 6, wherein the shaft comprises a plurality of axially extending convex arcuate surfaces, wherein each of the convex arcuate surfaces is disposed between the concave arcuate surfaces.

8. The winch of claim 7, wherein in the first configuration of the clutch assembly in which the gear is fixed relative to the drum about the axis of the drum, each of the plurality of convex arcuate surfaces is radially aligned with each of the plurality of slots.

9. The winch assembly of claim 8, wherein in the second configuration of the clutch assembly in which the gear is rotatable relative to the drum about the axis of the drum, each of the plurality of concave arcuate surfaces is radially aligned with each of the plurality of slots.

10. The winch assembly of claim 9, further comprising:
a plurality of biasing members, each of the biasing members extending radially inward from the drum and configured contact the outer surface of the clutch shaft.

11. The winch assembly of claim 10, wherein the biasing members inhibit rotation of the clutch shaft relative to the drum.

12. The winch assembly of claim 9, wherein the inside surface of the gear comprises a plurality of axially extending concave arcuate surfaces for at least partially receiving the locking pins when the clutch assembly is in the first configuration.

13. A winch for securing a load to a vehicle with a strap, the winch comprising:
a mounting bracket with opposed flanges;
a drum extending along an axis between a first end and a second end, the drum mounted relative to the opposed flanges so that the drum is rotatable about its axis, the drum configured to retain the strap so that a rotation of the drum about the axis in a first direction pays in the strap and a rotation of the drum about the axis in a second direction pays out the strap;
a gear assembly comprising a gear received on the drum and a worm configured to mesh with the gear so that a rotation of the worm causes a rotation of the gear;
a clutch shaft disposed in a bore in the drum and rotatable relative to the bore between a first position in which the gear is fixed relative to the drum about the axis of the drum and a second position in which the gear is rotatable relative to the drum about the axis of the drum.

14. The winch of claim 13, wherein the drum defines an aperture radially connecting an opening in the outer surface of the drum and an opening in a surface of the drum that defines the bore.

15. The winch of claim 14, comprising a locking member slideably disposed in the aperture.

16. The winch of claim 15, wherein in the first position the locking member extends radially from the drum to engage with the gear.

17. The winch of claim 16, further comprising a biasing member to inhibit rotation of the clutch shaft relative to the drum about the drum axis.

\* \* \* \* \*